United States Patent
Chien

(10) Patent No.: US 10,796,856 B2
(45) Date of Patent: Oct. 6, 2020

(54) ALUMINUM CAPACITOR POSITIVE ELECTRODE FOIL PRODUCT HAVING HIGH VOLTAGE RESISTANCE AND MANUFACTURING METHOD THEREOF

(71) Applicant: TRUSVAL TECHNOLOGY CO., LTD., Miao-Li County (TW)

(72) Inventor: Shih-Pao Chien, Miao-Li County (TW)

(73) Assignee: Trusval Technology Co., Ltd., Miao-Li County (TW)

( * ) Notice: Subject to any disclaimer, the term of this patent is extended or adjusted under 35 U.S.C. 154(b) by 117 days.

(21) Appl. No.: 16/239,876

(22) Filed: Jan. 4, 2019

(65) Prior Publication Data

US 2020/0219660 A1 Jul. 9, 2020

(51) Int. Cl.
*H01G 9/045* (2006.01)
*H01G 9/00* (2006.01)
*H01G 9/048* (2006.01)

(52) U.S. Cl.
CPC .......... *H01G 9/045* (2013.01); *H01G 9/0029* (2013.01); *H01G 9/048* (2013.01)

(58) Field of Classification Search
CPC ....... H01G 9/045; H01G 9/0029; H01G 9/048
See application file for complete search history.

(56) References Cited

U.S. PATENT DOCUMENTS

| | | | |
|---|---|---|---|
| 2005/0151464 A1* | 7/2005 | Sung | H01J 29/28 313/503 |
| 2005/0275330 A1* | 12/2005 | Sung | H01L 37/00 313/311 |
| 2007/0042667 A1* | 2/2007 | Sung | H02N 11/002 445/51 |
| 2017/0040150 A1* | 2/2017 | Hsieh | C23C 14/562 |

* cited by examiner

*Primary Examiner* — Seahvosh Nikmanesh
(74) *Attorney, Agent, or Firm* — Rosenberg, Klein & Lee

(57) ABSTRACT

The invention provides an aluminum capacitor positive electrode foil product having high voltage resistance and a manufacturing method thereof. the manufacturing method mainly processes an aluminum foil substrate in a vacuum environment and comprises the steps of: heating the aluminum foil substrate; ion bombarding a surface of the aluminum foil substrate to form a pyramid surface layer; reverse sputtering the aluminum foil substrate for surface cleaning, decontamination and degreasing; depositing the aluminum foil substrate by an aluminum target material to form a deposition layer; oxidizing an outer surface of the deposition layer and spraying mixed gases on the outer surface of the deposition layer of the aluminum foil substrate to form an oxidized crystallizing layer; cooling the aluminum foil substrate; and rolling the aluminum foil substrate into a finished product.

2 Claims, 7 Drawing Sheets

ALUMINUM CAPACITOR POSITIVE ELECTRODE FOIL PRODUCT HAVING HIGH VOLTAGE RESISTANCE AND MANUFACTURING METHOD THEREOF

BACKGROUND OF THE INVENTION

1. Field of the Invention

The present invention relates to an aluminum capacitor positive electrode foil product having high voltage resistance and a manufacturing method thereof which has characteristics of high capacity ratio, high stability and high mechanical strength.

2. Description of Related Art

With the rapid development of technology, the volume of electronic components tends to be decreased, and the density and performance of electronic components per unit area become increased. In order to meet the capacitance of electronic components, the requirements for the quality of electronic products are increasing year by year. Referring to FIG. 7, a traditional capacitor is manufactured by the following steps: preparing an aluminum foil with high-purity and appropriate thickness (about 100 μm); cleaning a surface of the aluminum foil by a chemical agent, e.g. a strong acid or a strong alkali, in an erosion tank (91) to remove oil and rust; removing the chemical agent in a neutralization tank (92) and a cleaning tank (93); chemically etching the surface of the aluminum foil in a plurality of chemical tanks (94) to form a porous surface on the aluminum foil; neutralizing and cleaning the aluminum foil for further undergoing strong acid and electrochemical reactions in an oxidation tank (95) to form an oxide layer having voltage resistance; and respectively cleaning and drying the aluminum foil in a cleaning neutralization tank (96) and a drying tank (97) to acquire an aluminum capacitor positive electrode foil. However, the abovementioned manufacturing method has some disadvantages in the products and equipment used.

In terms of the products, the disadvantages includes: decreased mechanical strength and instability of the aluminum foil due to the difficulty in controlling the depth of erosion; occurrence of acid residue or crystallization due to chemical action, which affects subsequent use; low production rate; low capacity ratio; unstable product quality; high current consumption of high voltage electrode; and low yield.

In terms of the equipment used, the disadvantages includes: generation of severe environmental pollution, e.g. air pollution and water pollution due to the use of chemical agents; large energy consumption due to the use of high current and high voltage equipment; a large total volume of the tanks for cleaning, neutralization, erosion and the like, and the difficulty of transportation of aluminum foil in the liquid in the tanks; high cost; requirement of large-scale factory due to the large size of the equipment; low output; and low efficiency.

SUMMARY OF THE INVENTION

In view of the above-mentioned problems, the object of the present invention is to provide an aluminum capacitor positive electrode foil product having high voltage resistance and a manufacturing method thereof which has characteristics of high capacity ratio, high stability and high mechanical strength.

A manufacturing method of an aluminum capacitor positive electrode foil product having high voltage resistance is disclosed herein. It mainly processes an aluminum foil substrate in a vacuum environment and comprises the steps of: heating the aluminum foil substrate; ion bombarding a surface of the aluminum foil substrate to form a pyramid surface layer on the surface of the aluminum foil substrate; reverse sputtering the surface of the aluminum foil substrate for cleaning, decontamination and degreasing; depositing the aluminum foil substrate by an aluminum target material to form a deposition layer; oxidizing an outer surface of the deposition layer and spraying the mixed gases on the outer surface of the deposition layer of the aluminum foil substrate to form an oxidized crystallizing layer; cooling the aluminum foil substrate; and rolling the aluminum foil substrate into a finished product.

An aluminum capacitor positive electrode foil product having high voltage resistance is also disclosed herein. It comprises an aluminum foil substrate having a pyramid surface layer; a deposition layer disposed on the pyramid surface layer of the aluminum foil substrate; and an oxidized crystallizing layer disposed on the outer surface of the deposition layer of the aluminum foil substrate. Accordingly, the aluminum capacitor positive electrode foil product having characteristics of high voltage resistance, high mechanical strength, high capacity ratio and high stability is obtained.

DETAILED DESCRIPTION OF THE PREFERRED EMBODIMENT

Hereinafter, an exemplary embodiment of the present invention will be described in detail with reference to the accompanying drawings.

Figure 1:
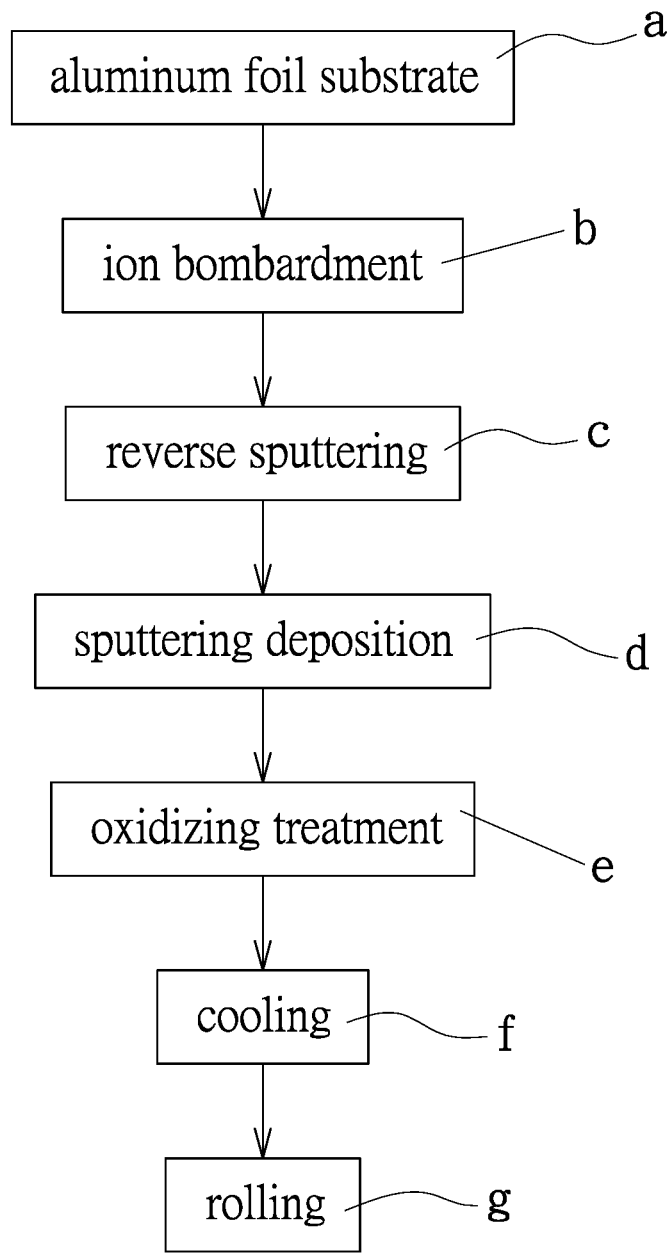
FIG. 1 is a flow chart showing a manufacturing method of an aluminum capacitor positive electrode foil product having high voltage resistance according to the present invention.

As showed in FIG. 1, a manufacturing method of an aluminum capacitor positive electrode foil product having high voltage resistance according to the present invention is disclosed. It comprises the following steps conducted in a vacuum environment:

(a) preparing an aluminum foil substrate (1) on a roller in a rolling-out chamber (10) and heating the aluminum foil substrate (1) at a temperature of 250° C.-350° C. for 30-60 seconds;

(b) transferring the aluminum foil substrate (1) from the rolling-out chamber (10) to a first chamber (20) for heating at a temperature of 250° C.-350° C. for 30-60 seconds and ion bombarding a surface of the aluminum foil substrate (1) for 30-60 seconds to form a pyramid surface layer (11) on the surface of the aluminum foil substrate (1);

(c) transferring the aluminum foil substrate (1) from the first chamber (20) to a second chamber (30) and reverse sputtering the surface of the aluminum foil substrate (1) for 30-60 seconds for cleaning, decontamination and degreasing;

(d) transferring the aluminum foil substrate (1) to a third chamber (40) and depositing the pyramid surface layer (11) of the aluminum foil substrate (1) by an aluminum target material for 30-60 seconds to form a deposition layer (2);

(e) transferring the aluminum foil substrate (1) to an oxidation chamber (50) filled with mixed gases of argon (Ar) and oxygen ($O_2$) for oxidation and spraying the mixed gases on an outer surface of the deposition layer (2) of the aluminum foil substrate (1) at a temperature of 150° C.-600° C. for 30-300 seconds to form an oxidized crystallizing layer (3);

(f) transferring the aluminum foil substrate (1) to a cooling chamber (60) for cooling the aluminum foil substrate (1) to a temperature below 100° C.; and (g) transferring the aluminum foil substrate (1) to a rolling-back chamber (70) and rolling the aluminum foil substrate (1) by a cooling roll (71) disposed in the rolling-back chamber (70) to form a finished product.

Specifically, various chambers including the rolling-out chamber, the first chamber, the second chamber, the third chamber, the oxidation chamber, the cooling chamber and the rolling-back chamber, have different vacuum degrees, different pressures and different temperatures depending on the requirements. Furthermore, the transfer processes of the above-mentioned manufacturing method from the rolling-out chamber (10) to the rolling-back chamber (70) are interlinked and automatically controlled.

Figure 2:
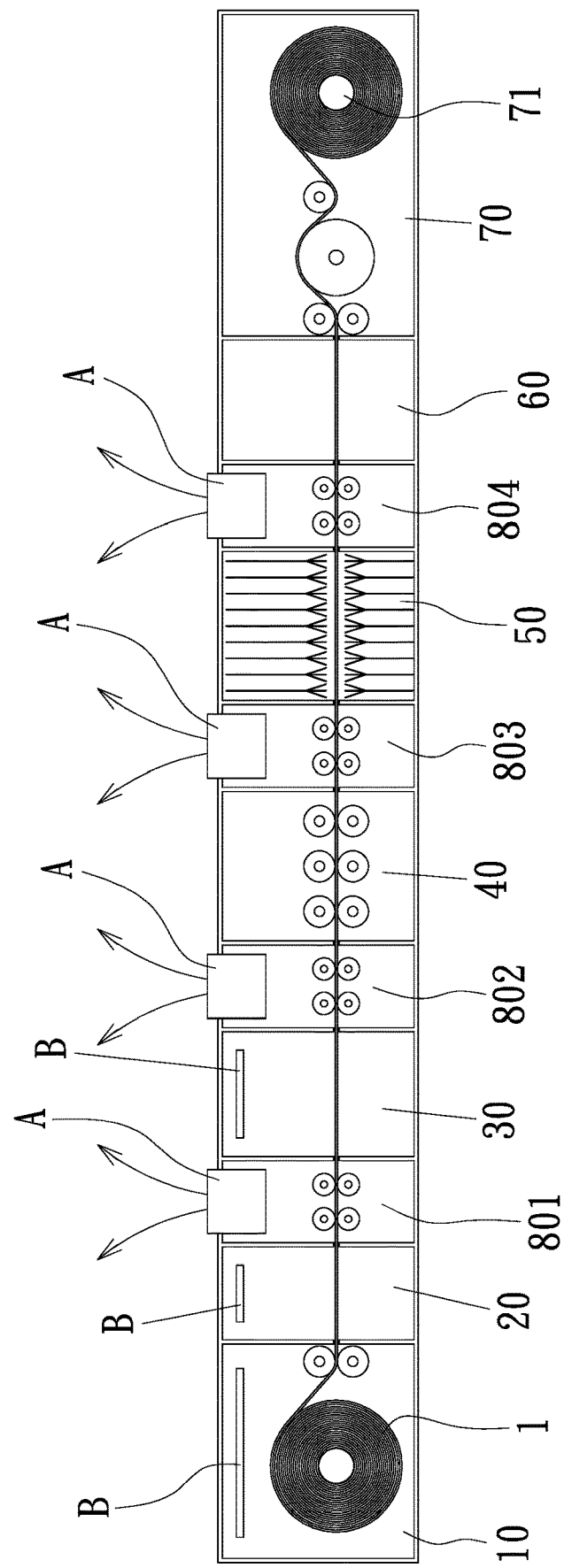
FIG. 2 is a schematic diagram showing a first embodiment for equipment used in the present invention.
Figure 3:
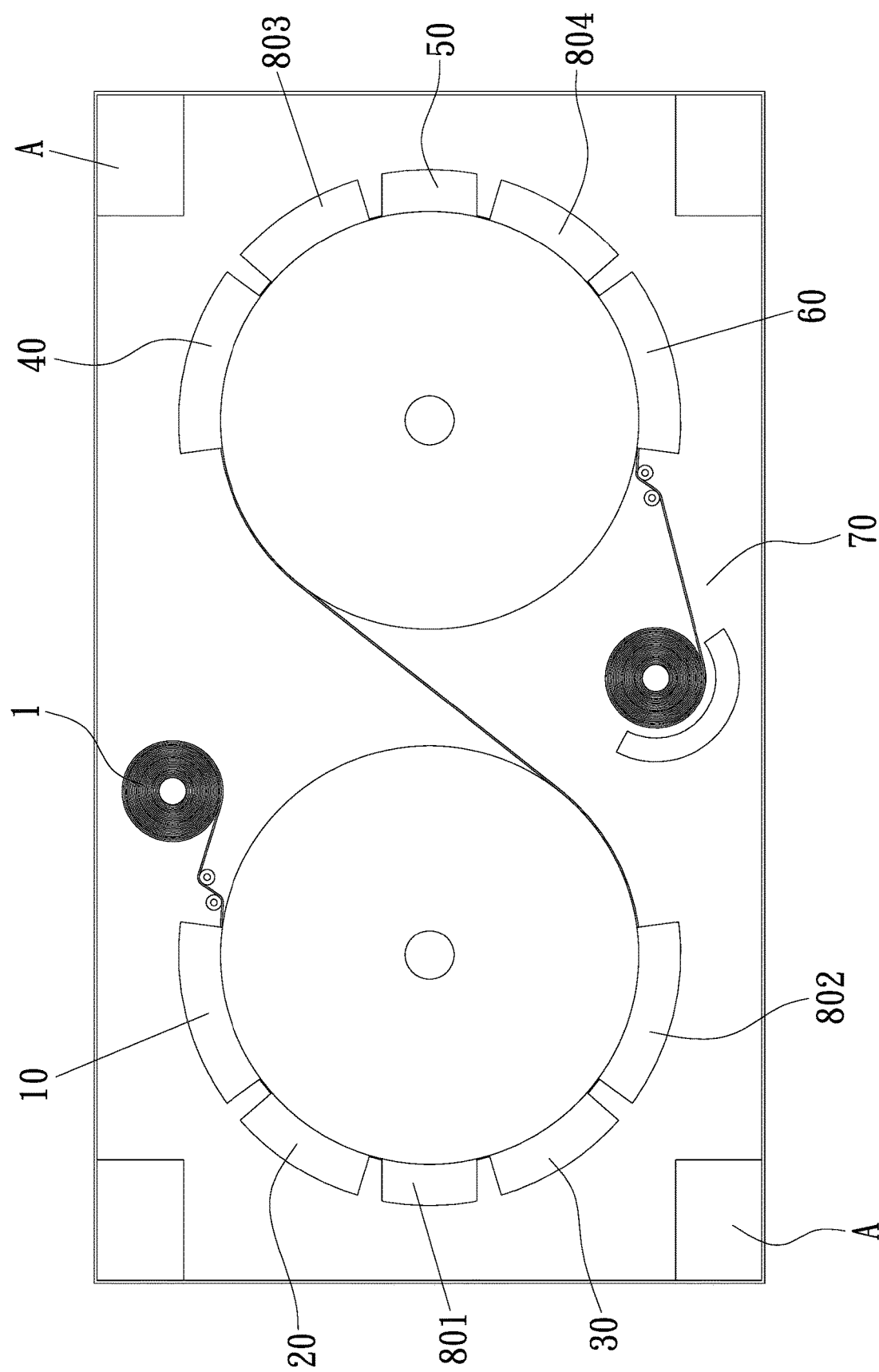
FIG. 3 is a schematic diagram showing a second embodiment for equipment used in the present invention.
Figure 4:
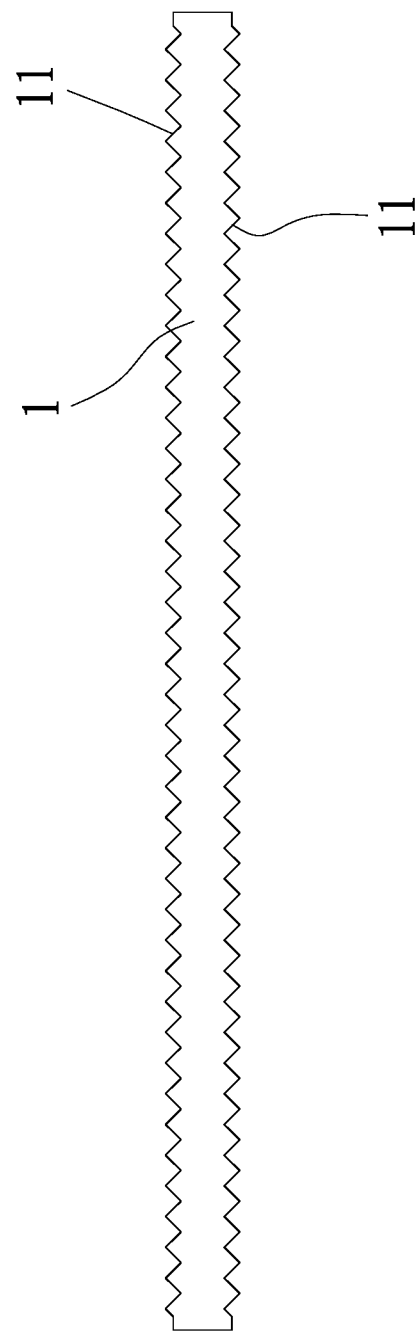
FIG. 4 is a schematic diagram showing that an aluminum foil substrate is bombarded to form a pyramid surface layer according to the present invention.
Figure 5:
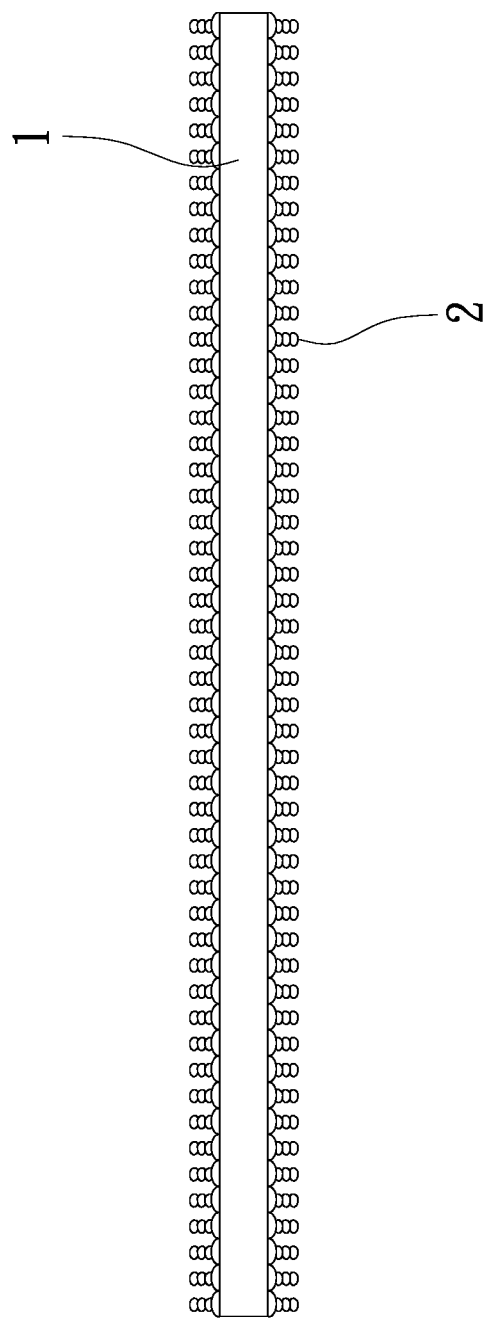
FIG. 5 is a schematic diagram showing the aluminum foil substrate having a deposition layer according to the present invention.
Figure 6:
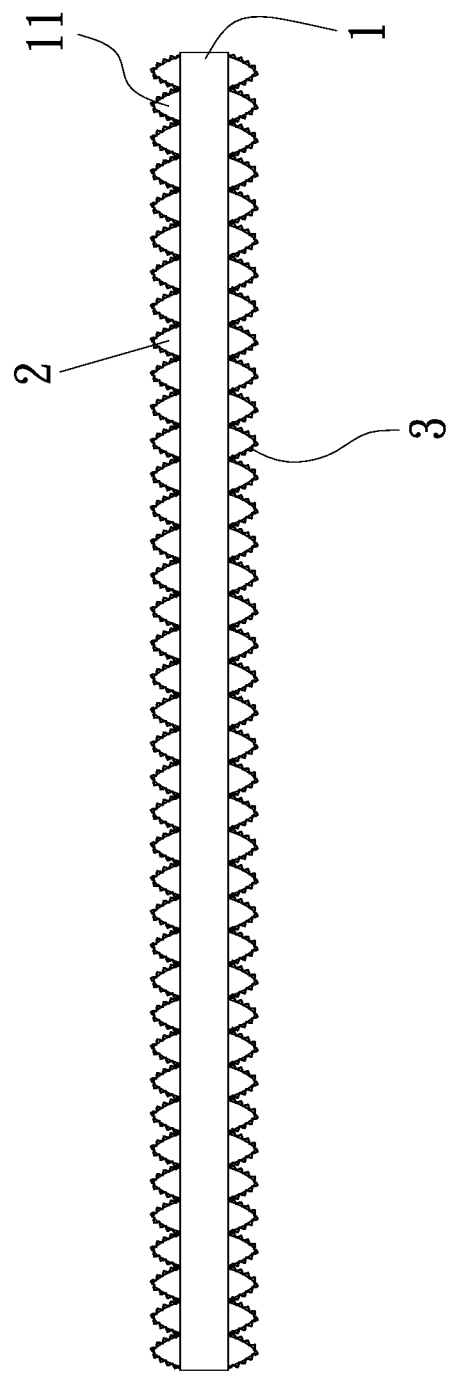
FIG. 6 is a schematic diagram showing the aluminum foil substrate having an oxidized crystallizing layer according to the present invention.
Figure 7:
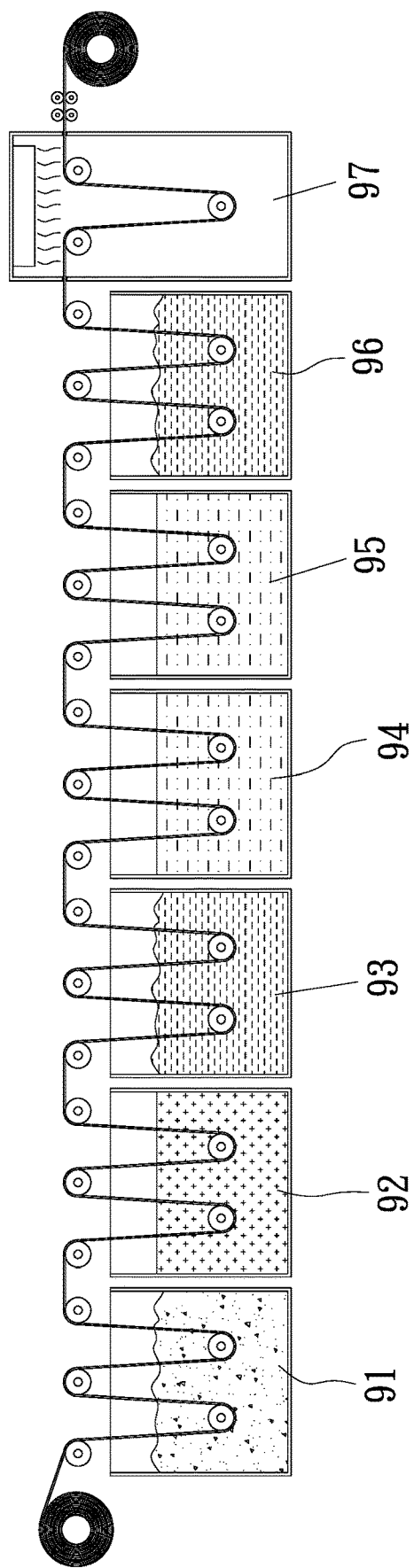
FIG. 7 is a schematic diagram showing equipment used in a prior art.

Referring to FIGS. 1-6, in a practical use, various chambers of the equipment used in the present invention are arranged in a straight line as shown in FIG. 2 or arranged at an angle according to the required design as shown in FIG. 3. At least one vacuum device (A) is provided in the equipment, and the whole process of the manufacturing method are carried out in a vacuum environment.

The transfer processes of the present manufacturing method from the rolling-out chamber (10) to the rolling-back chamber (70) are interlinked and automatically controlled. The aluminum foil substrate (1) is transferred from one chamber to the next adjacent chamber.

In the step (a), the aluminum foil substrate (1) on the roller is prepared in the rolling-out chamber (10), and the aluminum foil substrate (1) has a predetermined thickness (about 20-30 μm) less than a thickness of a traditional one (about 100 μm). Furthermore. the rolling-out chamber (10) is provided with at least one heating device (B) for heating the aluminum foil substrate (1) at the temperature of 250° C.-350° C. Then, in the step (b), the aluminum foil substrate (1) is transferred from the rolling-out chamber (10) to the first chamber (20). The first chamber (20) is provided with at least one heating device (B) for continuously heating the aluminum foil substrate (1) at the temperature of 250° C.-350° C. for 30-60 seconds. At the same time, the aluminum foil substrate (1) is processed by ion bombardment for 30-60 seconds in the first chamber (20) to form the pyramid surface layer (11) on the surface of the aluminum foil substrate (1), thereby completing the step (b).

The aluminum foil substrate (1) is transferred by a delivery chamber disposed between the two adjacent chambers, and the delivery chamber is provided with transmission wheels and maintains a vacuum environment. In the step (c), the aluminum foil substrate (1) is transferred from the first chamber (20) through transmission wheels in a first delivery chamber (801) to the second chamber (30), and the surface of the aluminum foil substrate (1) is processed by reverse sputtering for 30-60 seconds and then cleaned for decontamination and degreasing. In the step (d), the aluminum foil substrate (1) is transferred through transmission wheels in a second delivery chamber (802) to the third chamber (40). The aluminum foil substrate (1) is deposited by the aluminum target material which is the same material as the aluminum foil substrate (1) for 30-60 seconds in the third chamber (40) so as to form the deposition layer (2). The deposition layer (2) is shaped with a plurality of cones or cone-like protrusions, e.g. island-like protrusions.

In the step (e), the aluminum foil substrate (1) from the step (d) is transferred through transmission wheels in a third delivery chamber (803) to the oxidation chamber (50) filled with the mixed gases of argon (Ar) and oxygen ($O_2$) for oxidation, and the outer surface of the deposition layer (2) of the aluminum foil substrate (1) is sprayed with the mixed gases at the temperature of 150° C.-600° C. for 30-300 seconds to decompose, cleave and form the oxidized crystallizing layer (3), thereby completing the step (e). In the step (f), the aluminum foil substrate (1) is transferred through transmission wheels in a fourth delivery chamber (804) to the cooling chamber (60) for cooling to the temperature below 100° C. Finally, the aluminum foil substrate (1) is transferred to the rolling-back chamber (70). The rolling-back chamber (70) is provided with the cooling roll (71) for rolling the aluminum foil substrate (1) to form the finished product, thereby completing the step (g).

Compared with the technique available now, the present invention has the following advantages:

1. The finished product of the present invention has high mechanical strength and high stability, no chemical (acid or alkali) residue and no crystal production, so the finished product is not easy to break and has high quality and consistent quality.

2. The finished product of the present invention has improved yield rate and high capacity ratio.

3. The equipment used in the present invention does not generate harmful substances or gases, so the present invent solves the problem of environmental pollution.

4. The equipment used in the present invention is small in size and low in energy consumption, so the present invention can effectively reduce the cost.

5. The present manufacturing method has high output and high efficiency and is conducted in a vacuum environment without the need of sewage treatment equipment, so the conditions of the present manufacturing method are simple and easy to control, and the products prepared by the present manufacturing method are not subject to environmental pollution.

6. The aluminum foil substrate used in the process of the present invention has a less thickness and thus the present invent can save material.

What is claimed is:

1. A manufacturing method of an aluminum capacitor positive electrode foil product having high voltage resistance, comprising the following steps conducted in a vacuum environment:

(a) preparing an aluminum foil substrate on a roller in a rolling-out chamber and heating the aluminum foil substrate at a temperature of 250° C.-350° C. for 30-60 seconds;

(b) transferring the aluminum foil substrate from the rolling-out chamber to a first chamber for heating at a temperature of 250° C.-350° C. for 30-60 seconds and ion bombarding a surface of the aluminum foil substrate for 30-60 seconds to form a pyramid surface layer on the surface of the aluminum foil substrate;

(c) transferring the aluminum foil substrate from the first chamber to a second chamber and reverse sputtering the surface of the aluminum foil substrate for 30-60 seconds for cleaning, decontamination and degreasing;

(d) transferring the aluminum foil substrate to a third chamber and depositing the pyramid surface layer of the aluminum foil substrate by an aluminum target material for 30-60 seconds to form a deposition layer;

(e) transferring the aluminum foil substrate to an oxidation chamber filled with mixed gases of argon (Ar) and oxygen ($O_2$) for oxidation and spraying the mixed gases on an outer surface of the deposition layer of the aluminum foil substrate at a temperature of 150° C.-600° C. for 30-300 seconds to form an oxidized crystallizing layer;

(f) cooling the aluminum foil substrate to a temperature below 100° C. in a cooling chamber; and (g) rolling the aluminum foil substrate by a cooling roll disposed in a rolling-back chamber to form a finished product.

2. The manufacturing method of an aluminum capacitor positive electrode foil product having high voltage resistance as claimed in claim 1, wherein the aluminum foil substrate is transferred by a delivery chamber disposed between the two adjacent chambers, and wherein the delivery chamber is provided with transmission wheels and in a vacuum environment.

* * * * *